United States Patent
Barajas Gonzalez et al.

(10) Patent No.: US 9,251,044 B2
(45) Date of Patent: Feb. 2, 2016

(54) AUTOMATING RESPONSES TO EXPRESSIONS FROM AN EXECUTING COMPUTER PROGRAM

(71) Applicant: International Business Machines Corporation, Armonk, NY (US)

(72) Inventors: Emmanuel Barajas Gonzalez, Guadalajara (MX); Shaun E. Harrington, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 38 days.

(21) Appl. No.: 14/180,343

(22) Filed: Feb. 13, 2014

(65) Prior Publication Data

US 2015/0227451 A1    Aug. 13, 2015

(51) Int. Cl.
*G06F 11/36* (2006.01)

(52) U.S. Cl.
CPC ........ *G06F 11/3672* (2013.01); *G06F 11/3664* (2013.01)

(58) Field of Classification Search
CPC .......................... G06F 11/3672; G06F 11/3664
USPC ......................................................... 717/124
See application file for complete search history.

(56) References Cited

U.S. PATENT DOCUMENTS

| 7,054,924 | B1 * | 5/2006 | Harvey et al. ................. 709/220 |
| 8,230,390 | B2 | 7/2012 | Koster |
| 8,433,953 | B1 | 4/2013 | Gaudette et al. |
| 2010/0083211 | A1 * | 4/2010 | Poole et al. ................... 717/101 |
| 2010/0299561 | A1 * | 11/2010 | Marchant et al. ............... 714/35 |

* cited by examiner

*Primary Examiner* — Li B Zhen
*Assistant Examiner* — Viva Miller
(74) *Attorney, Agent, or Firm* — David W. Victor; Konrad Raynes Davda & Victor LLP (57) ABSTRACT

Provided are a computer program product, system, and method for automating responses to expressions from an executing computer program. An automation object includes a plurality of expressions and corresponding responses, wherein at least one of the responses includes a response variable. A configuration object provides machine specific values for the response variables in the responses for a target computer on which the target computer program will execute. Compiled responses are generated by replacing the response variables in the responses with the machine specific values for the response variables provided in the configuration object for the target computer on which the target computer program will execute. The expressions in the automation object are processed to provide compiled responses for expressions received from the executing target computer program.

24 Claims, 8 Drawing Sheets

```
<?xml version="1.0" encoding="UTF-8"?>
<job>
    <Main_Command arg="-X" command="ssh root@server">
        <expect id="1" timeout="20">
            <opt id="1" regex=""passw"">
                <response resp="sub{my $fh=shift; $fh->send("%password%
");}"/>
            </opt>
            <opt id="2" regex="". *RSA key.*"">
                <response resp="sub{my $fh=shift; $fh->send("yes
");exp_continue;}"/>
            </opt>
        </expect>
    </Main_Command>
</job>
```

```
<?xml version="1.0" encoding="UTF-8" standalone="no"?>
<parameters>
    <param id="1">
        <host value="caliman"/>
        <pass value="admin"/>
    </param>
    <param id="2">
        <host value="tintan"/>
        <pass value="admin"/>
    </param>
</parameters>
```

AUTOMATING RESPONSES TO EXPRESSIONS FROM AN EXECUTING COMPUTER PROGRAM

BACKGROUND OF THE INVENTION

1. Field of the Invention

The present invention relates to a computer program product, system, and method for automating responses to expressions from an executing computer program.

2. Description of the Related Art

During testing within the development cycle of a software product, there are tasks that often become repetitive and require user intervention in order to proceed. Such tasks are typically performed by a test team that familiarizes themselves with the product and test process. Due to this, the time period during which testing can occur is limited by the availability of the testing team. Within the human element of testing other problems exist, such as when one person who has expertise in a certain component or section of the testing leaves the project/team, then new team members be brought up to speed and become familiar all over again. The software development team may document tester operations and procedures for later use.

Automation programs are one method currently used to automate the testing process and reduce reliance on testers. Automation programs record the sequences of actions that need to be performed in order to execute a process successfully, while removing the possibility of error introduction. Automation tools are mainly composed of large and complex systems that are in charge of not only the execution of the jobs, but also monitoring them, recording the results, and documenting each specific run period.

SUMMARY

Provided are a computer program product, system, and method for automating responses to expressions from an executing computer program. An automation object includes a plurality of expressions and corresponding responses, wherein at least one of the responses includes a response variable. A configuration object provides machine specific values for the response variables in the responses for a target computer on which the target computer program will execute. Compiled responses are generated by replacing the response variables in the responses with the machine specific values for the response variables provided in the configuration object for the target computer on which the target computer program will execute. The expressions in the automation object are processed to provide compiled responses for expressions received from the executing target computer program.

DETAILED DESCRIPTION

Described embodiments provide techniques for automating the providing of responses to a target program by encoding an automation object to include responses for expressions for different commands from the target program. Further, the responses may include variables for which machine specific values are supplied from a configuration object so that the machine specific values maybe supplied for the responses for a machine specific environment.

Figure 1:
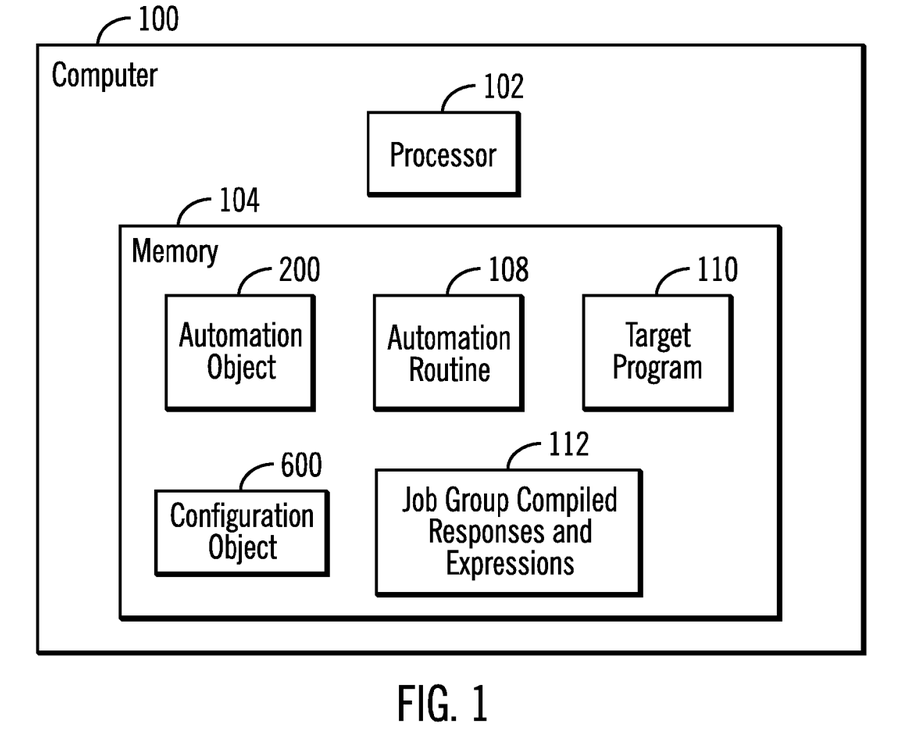
FIG. 1 illustrates an embodiment of a computer system.

FIG. 1 illustrates an embodiment of a computer 100 including a processor 102, comprising one or more processor devices, and a memory 104 including data structures and programs to execute, including an automation object 200 providing responses for expressions from program operations; a configuration object 600 providing values for variables in the responses in the automation object 200; an automation routine 108 for automating responses to an executing target program 110 to provide input to the target program 110 prompting for input from the user, such as through a displayed computer user interface, audio, etc. The automation routine 108 generates job group compiled responses and expressions 112 by including the values from the configuration object 600 into variables in responses in the automation object 200. The objects 200 and 600 and programs 108 and 110 may be loaded into the memory 104 for processing by the processor 102 from a storage device (not shown).

In certain embodiments, the target program 110 is being operated as part of a development and debugging process and the automation routine 108 provides responses to prompts generated from the target program 110 so the target program 110 can continue operating and producing output that can be gathered and monitored as part of developing and debugging the target program 110. In alternative embodiments, the automation routine 108 may be automating responses to the target program 110 prompts for purposes other than debugging, such as during deployed operations of the target program 110. The responses provided in the automation object 200 and the specific values provided in the configuration object 600 may be coded in response to feedback from testers and developers on the appropriate responses for specific prompts from the target program 110.

Figure 2:
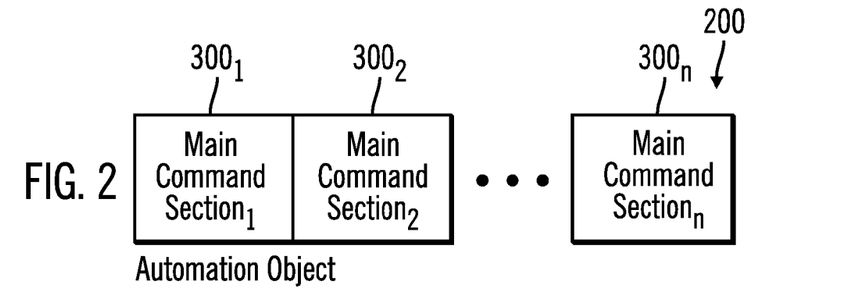
FIGS. 2-5 illustrate an embodiment of components of an automation object providing responses for expressions to supply to an executing program.

FIG. 2 illustrates an embodiment of an automation object 200, that provides the automated responses for prompts from the executing target program 110. The automation object 200 includes one or more main command sections $300_1, 300_2 \ldots 300_n$, which provides the automated responses for a particular main command executed by the target program 110 that remains active until terminated and requires interaction with the user. For instance a main command may comprise a command that activates a user interface or initiates other operations requiring user input.

Figure 3:
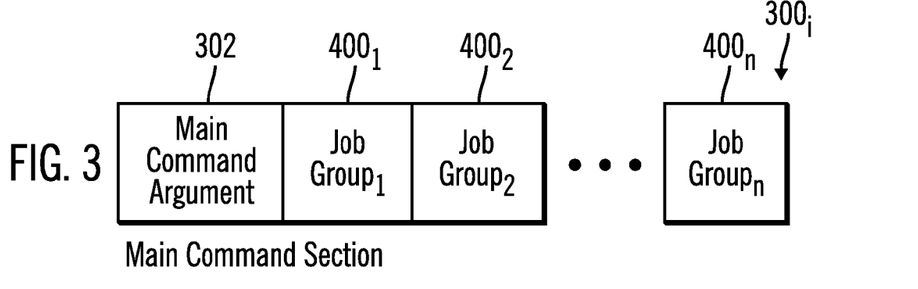

FIG. 3 illustrates an embodiment of an instance of a main command section $300_i$ as including a main command argument 302 that is the code or argument processed by the target program 110 to invoke the main command and a plurality of job group $400_1, 400_2 \ldots 400_n$ sections providing groupings of operations expected from the executed main command 302 for which responses are provided. The job groups $400_1$, $400_2 \ldots 400_n$ may be executed in a predetermined order, such that the expressions and responses in each job group $400_1$, $400_2 \ldots 400_n$ are considered in this predetermined order for the main command 302. The order may be specified by the order in which the job groups $400_1$, $400_2 \ldots 400_n$ are presented in the main command section $300_i$.

Figure 4:
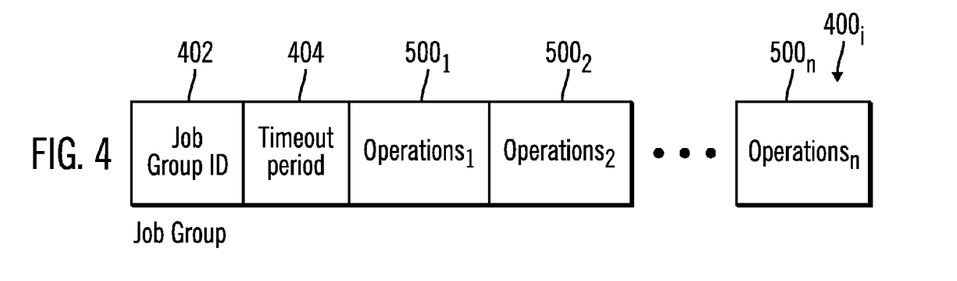

FIG. 4 illustrates an embodiment of a job group $400_i$ as including a job group identifier (ID) 402, which may indicate the order in which the job group is processed from the job groups in the main command section $300_i$; a timeout period 404, such that processing of the job group 402 is terminated if the time out period 404 passes without receiving a prompt from the target computer 410 for an expression identified in the job group 402; and one or more operations $500_1$, $500_2 \ldots 500_n$ that specify expressions expected to be produced by the target program 110 during its execution. In further embodiments, the time out period 404 may be undefined or indicate no time out.

Figure 5:
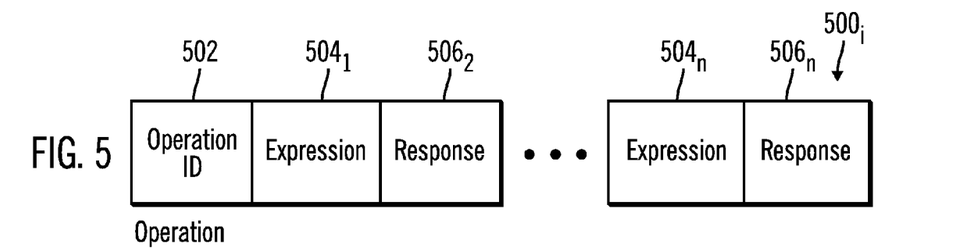

FIG. 5 illustrates an embodiment of an operation $500_i$ in a job group as including an operation identifier (ID) 502 and one or more expression/response pairs $504_1/506_1 \ldots 504_1/506_1$. An expression $504_1 \ldots 504_n$ may comprise the expected prompt or request from the target computer 110 and the response $506_1 \ldots 506_n$ may comprise the response or output to provide to the target computer 110 in response to receiving the corresponding expression $504_1 \ldots 504_n$ of the pair. The expressions $504_1 \ldots 504_n$ may or may not include variables that are to be populated from specific values included in the configuration object 600.

Figure 6:
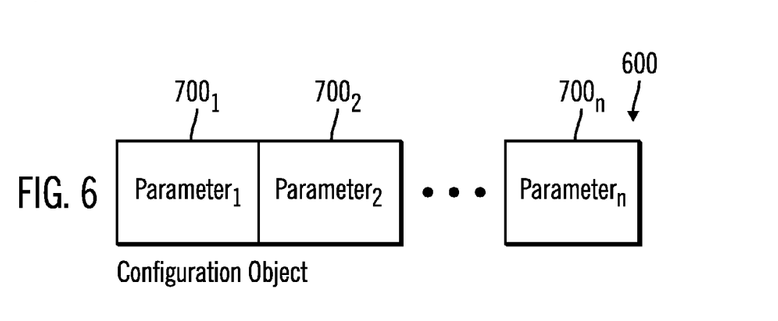
FIGS. 6-7 illustrate an embodiment of components of a configuration object providing specific values for variables in the responses in the automation object.

FIG. 6 illustrates an embodiment of a configuration object 600 that includes a plurality of parameter sections $700_1$, $700_2 \ldots 700_n$, where each parameter section provides specific values for different computer systems or machines for one of the variables in one or more responses $506_1 \ldots 506_n$ in one or more of the operations $500_1, 500_2 \ldots 500_n$. Variables may be repeated in different responses $506_1 \ldots 506_n$ in different or the same job group $400_1, 400_2 \ldots 400_n$. The variables may also be located in different parts of the configuration object 600.

Figure 7:
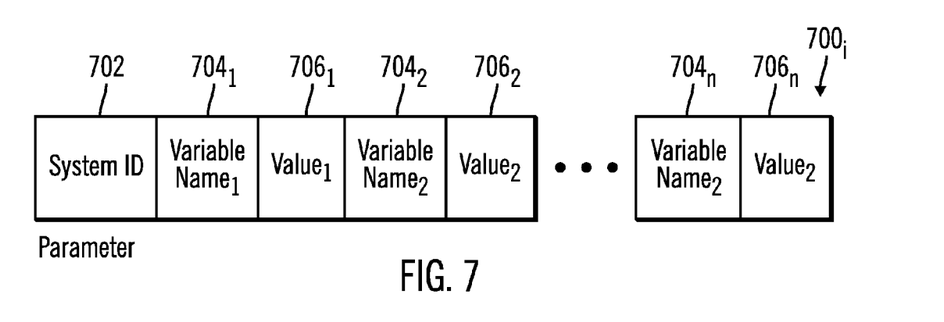

FIG. 7 illustrates an embodiment of an instance of a parameter $700_i$ in a configuration object 600 that is used to provide responses to the target program 110 prompting for user input, including a system identifier (ID) 702 of the system for which the value is to be used; variable names $704_1 \ldots 704_n$ of the variables included in the responses $506_1 \ldots 506_n$ and the machine 702 specific values $706_1 \ldots 706_n$ to be used for the variables $704_1 \ldots 704_n$ when providing responses for the system 702 or machine. In this way, each parameter section $700_i$ provides the specific values for one system 702 or machine. The system ID 702 may comprise a unique identifier of a particular system or machine, such as a serial number, network address, computer name, etc.

In the described embodiments the reference numeral "n" is used to denote an instance number of the element, and may comprise the same or different number of elements when used with different elements, such as $300_n, 400_n, 500_n, 700_n, 704_n, 706_n$.

The automation object 200 and configuration object 600, and all their components as shown in FIGS. 2, 3, 4, 5, 6, and 7 may be implemented in data structures known in the art, such as in a structured document (e.g., an Extended Markup Language (XML) document), a database, flat file, etc.

Figure 8:
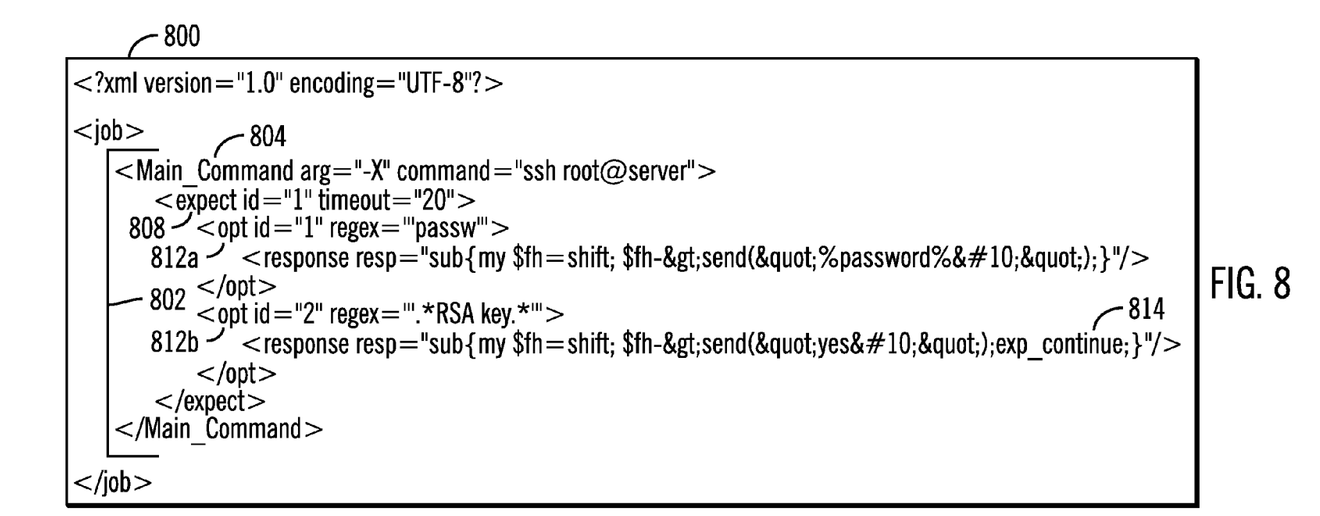
FIG. 8 illustrates an example of an automation object.

FIG. 8 provides an example of an implementation of a automation object 800, having a main command section 802, a main command 804, a job group 806, job group ID 808, time out 810, and operations 812a, 812b each having expressions ("regex") and responses ("response rasp"). In certain embodiments, if a response includes an expression continue ("exp_continue") statement 814, then the processing of the current job group being processed will continue and wait for more expressions from the target program 110 until the time out 810 period expires without receiving a matching expression from the target program 110. If the response does not include the expression continue ("exp_continue") statement, then the execution of the current job group 808 being processed may end and a next job group will be processed.

Figure 9:
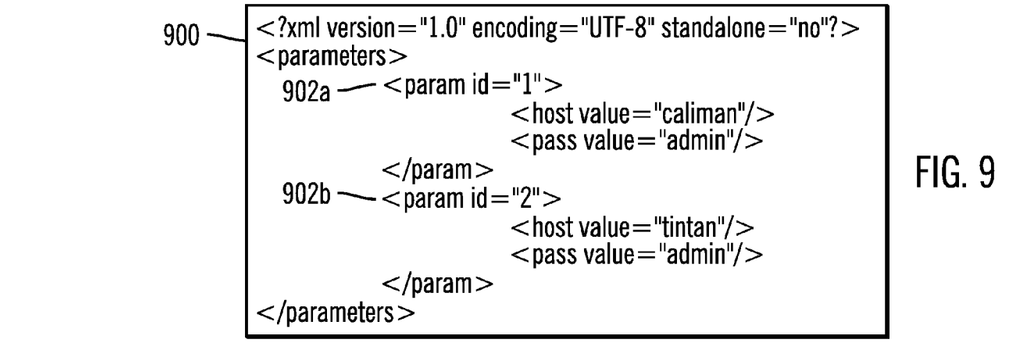
FIG. 9 illustrates an example of a configuration object.

FIG. 9 illustrates an example of an implementation of a configuration object 900, having parameter sections 902a, 904b, having a system ID ("Parma id") and specific values for two variables "host value" and "pass value".

The automation 200 and configuration 600 objects may be created using the advice of testers to determine the type of responses to provide for expressions generated by the target program 110 to test the target program 110. Responses with variables may be organized for different commands and organized in job groups that are executed sequentially based on the expectation of the types of expressions generate during the execution of main command at different stages of operations.

Figure 10:
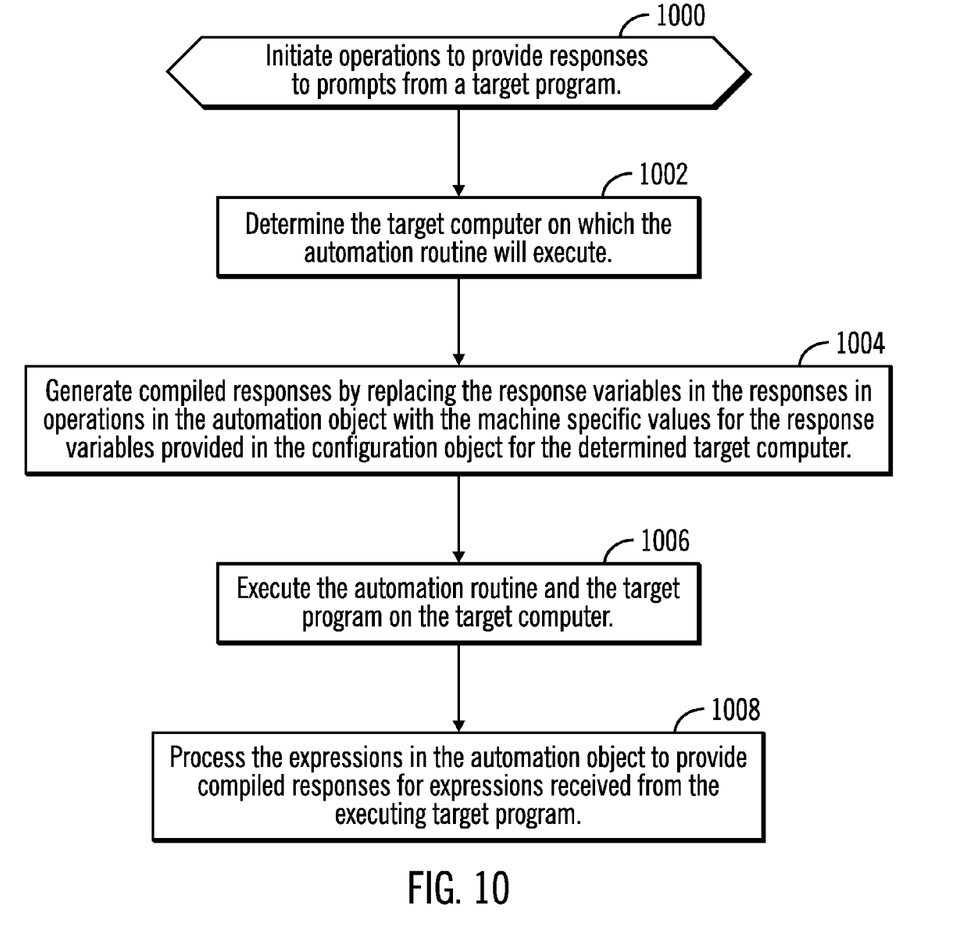
FIG. 10 illustrates an embodiment of operations to provide responses to prompts from a target program.

FIG. 10 illustrates an embodiment of operations performed by the automation routine 108 to provide responses to prompts from the executing target program 110. Upon initiating (at block 1000) operations, the automation routine 108 determines (at block 1002) the target computer 100 on which the automation routine 108 is executing. The automation routine 108 generates (at block 1004) compiled responses 112 by replacing the response variables in the responses $506_1 \ldots 506_n$ in operations in the automation object 200 with the machine specific values $706_1 \ldots 706_n$ for the response variables provided in the configuration object 600 for the determined target computer. Certain of the compiled responses may not have variables replaced with specific values from the configuration object 600. The automation routine 108 and the target program 110 execute (at block 1006) on the target computer 100. The automation routine 108 processes (at block 1008) the expressions $504_1 \ldots 504_n$ in the automation object 200 to provide compiled responses for matching expressions received from the executing target program 110.

Figure 11:
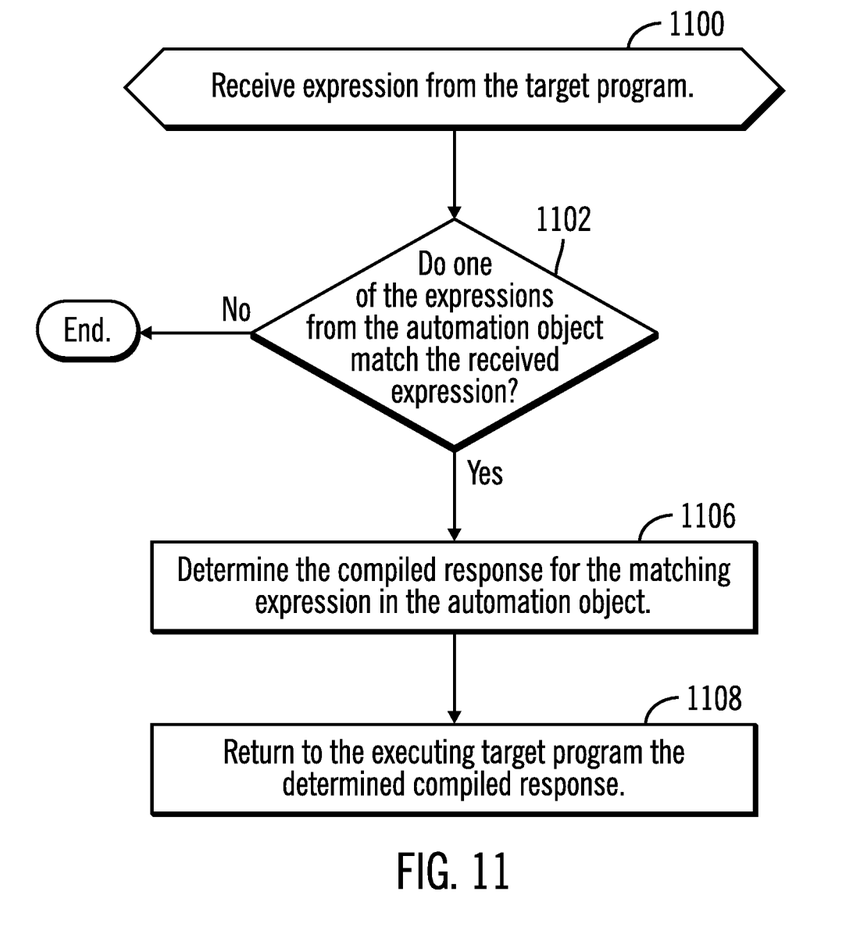
FIG. 11 illustrates an embodiment of operations to process an expression received from the target program.

FIG. 11 illustrates an embodiment of operations performed by the executing automation routine 200 to process a received expression from the target program 110. Upon receiving (at block 1100) the expression from the target program 110, the automation routine 108 determines (at block 1102) whether one of the expressions from the automation object 200 matches the received expression. If not, then control ends and the automation routine 200 may continue waiting for further expressions from the target program 110 to check until the timer times out. Otherwise, if the received expression matches one of the expressions $504_1 \ldots 504_n$ in the automation object 200, the automation routine 108 determines (at block 1106) the compiled response for the matching expression in the automation object 200. The determined compiled response is returned (at block 1108) to the executing target program 110.

Figure 12:
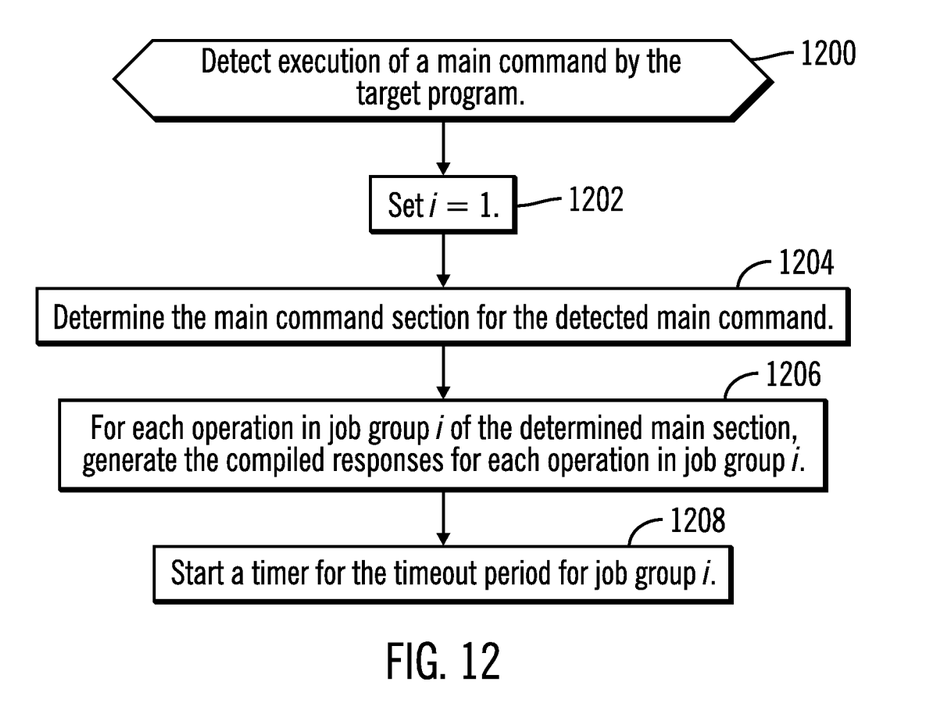
FIG. 12 illustrates an embodiment of operations to process a main command executed by the target program.

FIG. 12-15 illustrate further embodiments of operations performed by the automation routine 108 to compile the responses and process expressions received from the target program 110. FIG. 12 illustrates an embodiment of operations to process prompts and expressions from the target program 110. Upon detecting (at block 1200) the target program 110 executing a main command identified in one of the main command sections $300_1, 300_2 \ldots 300_n$ in the automation object 200, a variable i is set (at block 1202) to 1 indicating a current job group being processed for matching expressions.

The automation routine 108 determines (at block 1204) the main command section $300_1, 300_2 \ldots 300_n$ for the determined main command. For each operation $500_1, 500_2 \ldots 500_n$ in the current job group i of the determined main section, the automation routine 108 generates (at block 1206) the compiled responses 112 for each operation $500_1, 500_2 \ldots 500_n$ in the current job group i by replacing variables in the responses $506_1 \ldots 506_n$ with specific values $706_1 \ldots 706_n$ for variables $704_1 \ldots 704_n$ from the configuration object 600 matching the variables in the responses $506_1 \ldots 506_n$ in the operations $500_1, 500_2 \ldots 500_n$ in the current job group i. As mentioned, some compiled responses may not have variables from the configuration object 600, and just comprise the response $506_j$ provided for the expression $504_j$. A timer is then set (at block 1208) to the time out period 404 for the current job group i.

Figure 13:
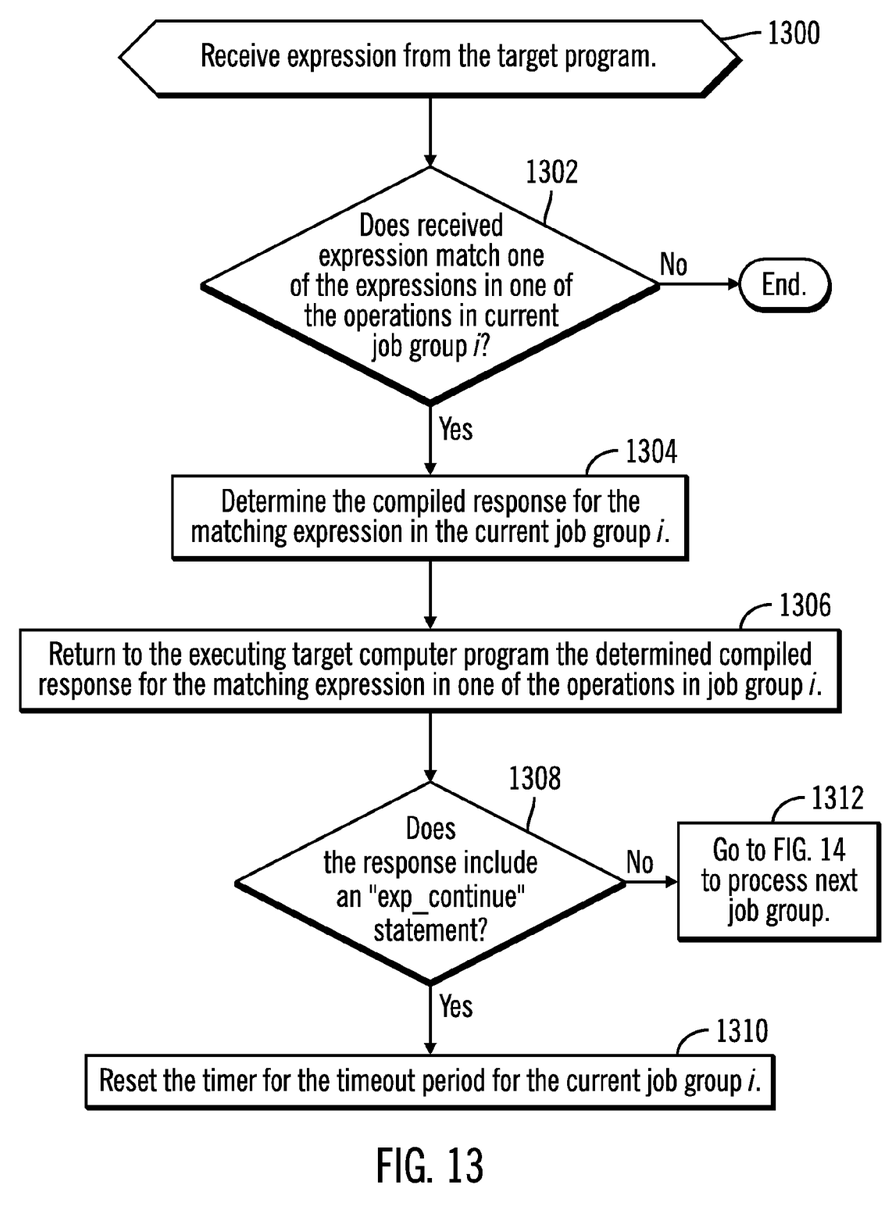
FIG. 13 illustrates an embodiment of operations to process an expression received from the target program.

FIG. 13 illustrates an embodiment of operations performed by the automation routine 108 to process a received expression from the target program 110, such as through a prompt on the console of the target program 110. If (at block 1302) the received expression matches one of the expressions $504_1 \ldots 504_n$ in one of the operations $500_1, 500_2 \ldots 500_n$ in the current job group i being processed, then the compiled response for the matching expression is determined (at block 1304). The determined compiled response is returned (at block 1306) to the target program 110.

If (at block 1308) the response includes an expression continue statement, e.g., "exp_continue", then the timer is reset (at block 1310) to allow the current job group i to continue to be considered for received expressions. If (at block 1308) there is no continue expression statement, then control proceeds (at block 1312) to FIG. 14 to process the next job group, e.g., i+1, as the current job group. If (at block 1302) there is no expression in the current job group i matching the received expression, then the automation routine 108 may wait for the next expression or time out or report an error.

Figure 14:
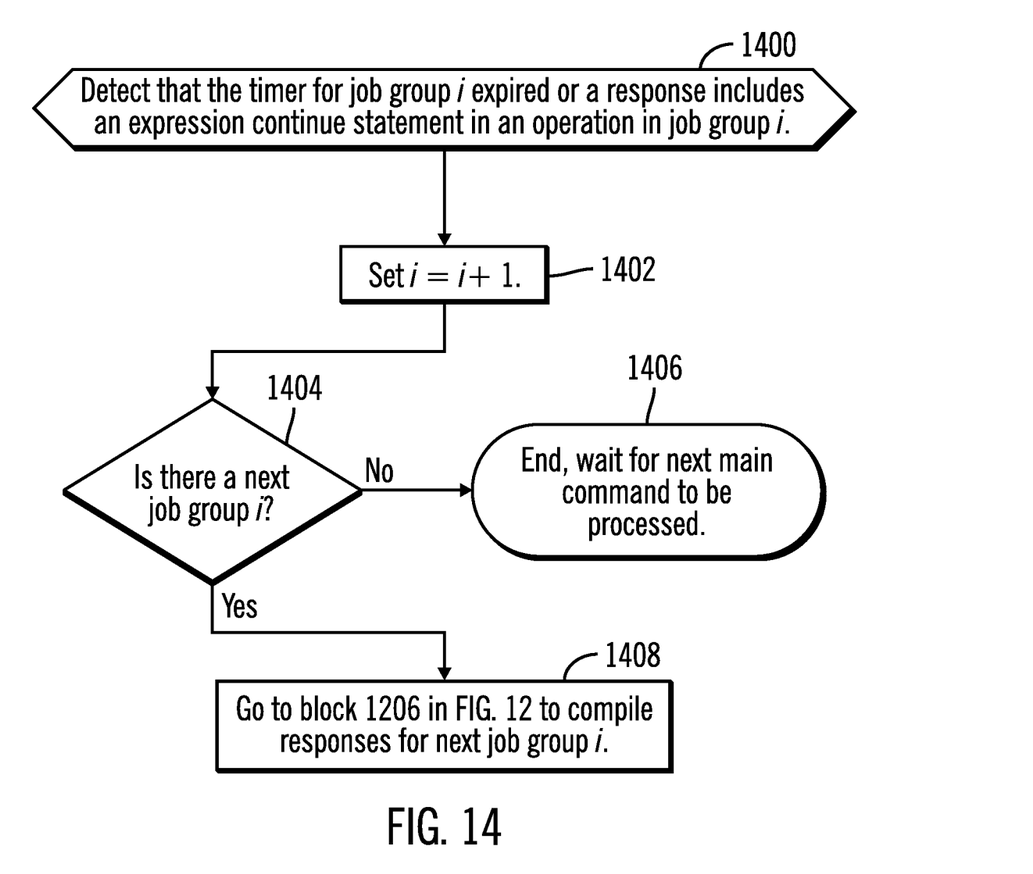
FIG. 14 illustrates an embodiment of operations to processes the expiration of a timer for a job group of the expressions being considered.

FIG. 14 illustrates an embodiment of operations performed by the automation routine 108 in response to determining (at block 1400) the timer for the current job group i has expired or the response processed in one of the operations $500_1, 500_2 \ldots 500_n$ does not include the expression continue ("exp_continue") statement, then i is incremented (at block 1400). If (at block 1404) there is a next job group i, then control proceeds (at block 1408) to block 1206 in FIG. 12 to compile responses for the next job group i and try to resolve expressions from the next job group i. Otherwise, if (at block 1404) there is no next job group i, then control ends (at block 1406) and the automation routine 108 waits to detect the next main command from the target program 110 if the automation object includes further main commands.

When the target program 110 completes or terminates the main command, then the automation routine 108 stops using the job groups for the main command to process expressions and prompts from the target program 108.

Described embodiments provide techniques to organize responses in job groups to provide in response to expressions from a target program that is executing. Further, the responses may include variables and during execution, the automation routine replaces the variables for specific values for the target computer in which the target program and automation routine are executing so that responses have the machine specific values for variables. In this way, the automation routine may provide responses in different computing environments by using machine specific values for the variables included in responses. With described embodiments, responses may be automatically produced by the automation routine from the automation object so as to reduce the need for human operators to supply input to keep the target program 108 operating during operations, such as testing and debugging.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (IS) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (PLAN) or a wide area network (WAN), or the connection may be made to an external computer (for example, through the Internet using an Internet Service Provider). In some embodiments, electronic circuitry including, for example, programmable logic circuitry, field-programmable gate arrays (FAA), or programmable logic arrays (PAL) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating output to control a target program executing on a target computer, the computer program product comprising a computer readable storage medium having computer readable program code embodied therein that executes to perform operations, the operations comprising:

providing an automation object including a plurality of expressions and corresponding responses organized into job groups, wherein at least one of the responses includes a response variable;

providing a configuration object providing machine specific values for the response variables in the responses for the target computer;

generating compiled responses by replacing the response variables in the responses with the machine specific values for the response variables provided in the configuration object for the target computer on which the target program will execute;

processing the expressions in the automation object to provide compiled responses for expressions received from the executing target program;

terminating the processing of one of the job groups being processed in response to determining that one of the expressions in the job group being processed has not been found to match a received expression within a timeout period; and processing another of the job groups in the automation object in response to the timeout period expiring.

2. The computer program product of claim 1, wherein the configuration object includes machine specific values for the response variables for a plurality of target computers, wherein generating the compiled responses comprises:

determining the target computer on which the target program will execute, wherein the machine specific values used to replace the response variables comprise the machine specific values provided for the determined target computer in the configuration object.

3. The computer program product of claim 1, wherein the operations further comprise:

for each outputted expression generated by the executing target computer, determining whether one of the expressions from the automation object matches the outputted expression;

determining the compiled response for the matching expression in the automation object; and returning to the executing target program the determined compiled response.

4. The computer program product of claim 3, wherein the executing target computer generates the outputted expressions as output on a display console, and wherein the response output is communicated as input to the executing target program.

5. The computer program product of claim 1, wherein the operations further comprise:

for each of the job groups, performing:

processing the job group in the automation object as a current job group;

determining whether a received expression from the target program matches one of the expressions in the current job group; and returning to the executing target program the determined compiled response for the matching expression in the current job group.

6. The computer program product of claim 5, wherein the job groups are processed sequentially in the automation object, wherein the generating the compiled responses is performed for the responses included in the current job group being processed.

7. The computer program product of claim 5, wherein there is a timeout period associated with each job group, wherein the job groups in the automation object are processed until all the job groups have been processed.

8. The computer program product of claim 7, wherein the automation object includes the timeout for each of the job groups.

9. The computer program product of claim 5, wherein the operations further comprise:

determining whether the compiled response for the expression in the automation object matching the expression received from the target computer includes a continue expression statement;

terminating the processing of the current job group being processed in response to determining that the compiled response for the matching expression in the automation object does not include the expression continue statement; and processing another job group in the automation object until all the job groups have been processed in response to terminating the processing of the current job group.

10. The computer program product of claim 5, wherein a plurality of the job groups are ordered under different main commands executed by the target program, wherein the operations further comprise:

determining one main command executed by the target program, wherein the job groups associated with the main command are processed until the determined main command is terminated.

11. The computer program product of claim 5, wherein a plurality of the job groups are ordered under different main commands executed by the target program, wherein the operations further comprise:

determining one main command executed by the target program, wherein the job groups associated with the main command are processed until all of the job groups for the main command have been processed.

12. The computer program product of claim 1, wherein the target program comprises a computer program product being tested, and wherein the expressions and corresponding responses in the automation object are developed by analyzing input to provide to expressions from the target program.

13. A system executing a target program, comprising:

a processor; and a computer readable storage medium having computer readable program code embodied therein that executes to perform operations, the operations comprising:

providing an automation object including a plurality of expressions and corresponding responses organized into job groups, wherein at least one of the responses includes a response variable;

providing a configuration object providing machine specific values for the response variables in the responses for a target computer on which the target program will execute;

generating compiled responses by replacing the response variables in the responses with the machine specific values for the response variables provided in the configuration object for the target computer on which the target program will execute;

processing expressions in the automation object to provide compiled responses for expressions received from the executing target program;

terminating the processing of one of the job groups being processed in response to determining that one of the expressions in the job group being processed has not been found to match a received expression within a timeout period; and processing another of the job groups in the automation object in response to the timeout period expiring.

14. The system of claim 13, wherein the configuration object includes machine specific values for the response variables for a plurality of target computers, wherein generating the compiled responses comprises:

determining the target computer on which the target program will execute, wherein the machine specific values used to replace the response variables comprise the machine specific values provided for the determined target computer in the configuration object.

15. The system of claim 13, wherein the operations further comprise:

for each outputted expression generated by the executing target computer, determining whether one of the expressions from the automation object matches the outputted expression;

determining the compiled response for the matching expression in the automation object; and returning to the executing target program the determined compiled response.

16. The system of claim 13, wherein the operations further comprise:

for each of the job groups, performing:
processing the job group in the automation object as a current job group;
determining whether a received expression from the target program matches one of the expressions in the current job group; and
returning to the executing target program the determined compiled response for the matching expression in the current job group.

17. The system of claim 16, wherein the job groups are processed sequentially in the automation object, wherein the generating the compiled responses is performed for the responses included in the current job group being processed.

18. The system of claim 16, wherein there is a timeout period associated with each job group, wherein the job groups in the automation object are processed until all the job groups have been processed.

19. A method for generating output to control a target program, comprising:

providing an automation object including a plurality of expressions and corresponding responses organized into job groups, wherein at least one of the responses includes a response variable;

providing a configuration object providing machine specific values for the response variables in the responses for a target computer on which the target program will execute;

generating compiled responses by replacing the response variables in the responses with the machine specific values for the response variables provided in the configuration object for the target computer on which the target program will execute;

processing expressions in the automation object to provide compiled responses for expressions received from the executing target program;

terminating the processing of one of the job groups being processed in response to determining that one of the expressions in the job group being processed has not been found to match a received expression within a timeout period; and processing another of the job groups in the automation object in response to the timeout period expiring.

20. The method of claim 19, wherein the configuration object includes machine specific values for the response variables for a plurality of target computers, wherein generating the compiled responses comprises:

determining the target computer on which the target program will execute, wherein the machine specific values used to replace the response variables comprise the machine specific values provided for the determined target computer in the configuration object.

21. The method of claim 19, further comprising:

for each outputted expression generated by the executing target computer, determining whether one of the expressions from the automation object matches the outputted expression;

determining the compiled response for the matching expression in the automation object; and returning to the executing target program the determined compiled response.

22. The method of claim 19, further comprising:

for each of the job groups, performing:
processing the job group in the automation object as a current job group;
determining whether a received expression from the target program matches one of the expressions in the current job group; and
returning to the executing target program the determined compiled response for the matching expression in the current job group.

23. The method of claim 22, wherein the job groups are processed sequentially in the automation object, wherein the generating the compiled responses is performed for the responses included in the current job group being processed.

24. The method of claim 22, wherein there is a timeout period associated with each job group, wherein the job groups in the automation object are processed until all the job groups have been processed.

* * * * *